United States Patent [19]

Scarpa

[11] 3,820,204

[45] June 28, 1974

[54] CLAW HOOK WITH AN AUTOMATIC SAFETY DEVICE

[75] Inventor: Orlando Scarpa, Venezia, Italy

[73] Assignee: Luciano Ciampi, Venice, Italy

[22] Filed: Mar. 20, 1973

[21] Appl. No.: 343,185

[30] Foreign Application Priority Data
Mar. 25, 1972 Italy.................. 84117/72

[52] U.S. Cl................................... 24/232, 24/242
[51] Int. Cl............................................. A44b 13/00
[58] Field of Search ....... 294/82 R, 83 R; 24/241 P, 24/241 PL, 241 TC, 242, 232, 238, 239

[56] References Cited
UNITED STATES PATENTS

| 319,972 | 6/1885 | Giffard | 24/241 PL |
| 370,333 | 9/1887 | Huff | 24/242 |
| 462,616 | 11/1891 | Birkett | 24/232 UX |
| 714,777 | 12/1902 | Buck | 24/239 |
| 963,931 | 7/1910 | Olson | 24/242 X |
| 1,394,068 | 10/1921 | Cousins | 24/238 |
| 2,607,604 | 8/1952 | Nelson | 24/232 UX |

FOREIGN PATENTS OR APPLICATIONS

| 9,947 | 8/1886 | Great Britain | 24/232 |

Primary Examiner—Donald A. Griffin
Attorney, Agent, or Firm—D. Paul Weaver

[57] ABSTRACT

A claw hook is described having a safety guard. The hook is pivotally mounted with respect to the guard, and, by virtue of an inclined plane arrangement, the hook and guard are automatically brought to a closed condition when the hook is connected to a load to be lifted and force is exerted on the hook through a lifting rope or cable.

5 Claims, 6 Drawing Figures

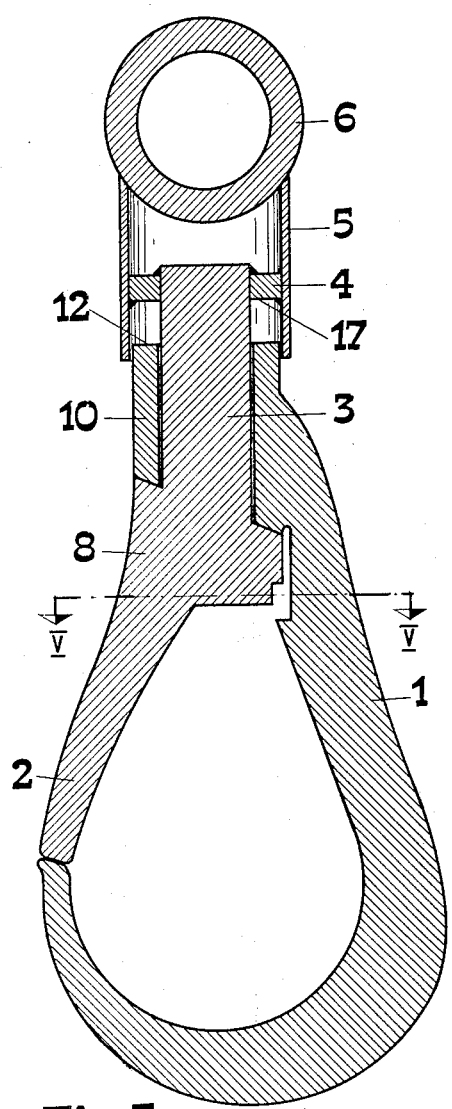
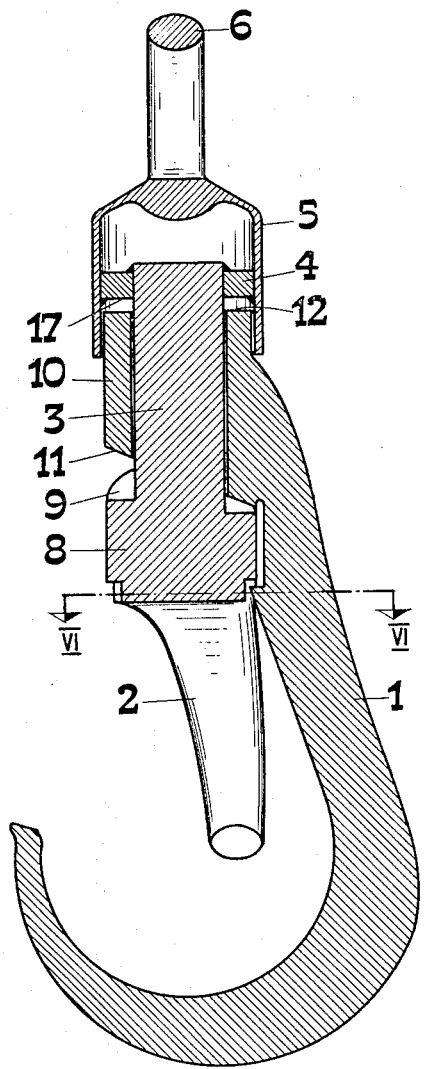
Fig.3      Fig.4
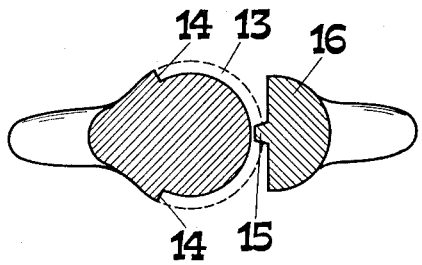
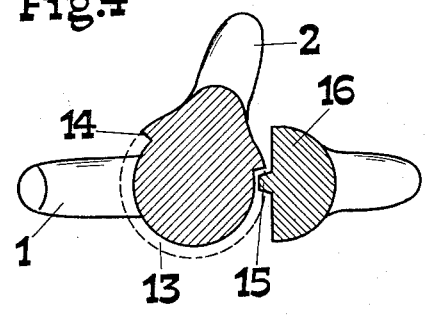
Fig.5      Fig.6

CLAW HOOK WITH AN AUTOMATIC SAFETY DEVICE

BACKGROUND OF THE INVENTION

Claw hooks that are adapted to be attached to the cables or straps of a load for the purpose of lifting or dragging the load are well known and have been in use for many years. The simplest and most common of this kind of hook is the open hook. This type of hook allows a very rapid engagement of the load straps, but does not afford enough safety against accidental disengagement of one of the straps, nor does it guard against possible catching of the end of the hook on some object that may be close to the path of movement of the hook.

There are also hooks in use which have been provided with various types of guard members, such as, for example, "spring catch" hooks in which a guard is normally resiliently biased to a closed position. These types of hooks, however, require the use of both hands when attaching the hook to the load straps in that one hand must be used to hold the hook, while the other hand is used to overcome the bias of the spring. Moreover, these types of hooks are subject to the objection that the guard member may be opened if it comes against an obstruction during sidewise movement of the claw hook whereby one or more of the load straps or cables may be released from the claw hook. They are further subject to objection in that the guard members sometimes become jammed in use, or the guard members do not fully close because of contact with the lifting straps or cables, or the spring may become weakened or is broken.

SUMMARY OF THE INVENTION

The safety device of the present invention contemplates a claw hook for attachment to a load which has a safety guard associated therewith, with the guard being directly attached to a lifting or towing cable, which is in turn connected to a winch or other source of power. Once a load is attached to the claw hook and force is applied to the lifting cable, the claw hook and the guard are caused to pivot around an axis in line with the lifting cable, and are automatically forced to a closed position, with respect to each other, through a system of matching inclined planes. Means are also disclosed for limiting the angle through which the claw hook can pivot relative to the safety guard.

With the guard device of the present invention, the closing movement of the guard is automatically initiated without requiring relative movement between the hook and the lifting cable secured to it, with the loading point of the hook being maintained on the same plane with respect to the lifting cable under most circumstances. Further, the opening of the guard with respect to the claw hook, once the hook is attached to a load, is resisted so long as force is applied to the lifting cable, and the resistance to opening is directly proportional to the amount of force being applied on the lifting cable.

With the pivotal arrangement of the guard and claw hook, the possibility of "pinching" the load straps between the guard and the claw hook, and of imperfect closing of the guard are virtually eliminated.

BRIEF DESCRIPTION OF THE DRAWINGS

FIG. 3 is a side elevational view, in section, of the hook and guard shown in its closed position;

FIG. 4 is a side elevational view, partially in section, of the hook and guard shown in its open position;

FIG. 5 is a transverse view, partially in section, taken along the lines V — V of FIG. 3, looking in the direction of the arrows; and FIG. 6 is a transverse view, partially in section, taken along lines VI — VI of FIG. 4, looking in the cirections of the arrows.

DESCRIPTION OF THE PREFERRED EMBODIMENT

Figure 1:
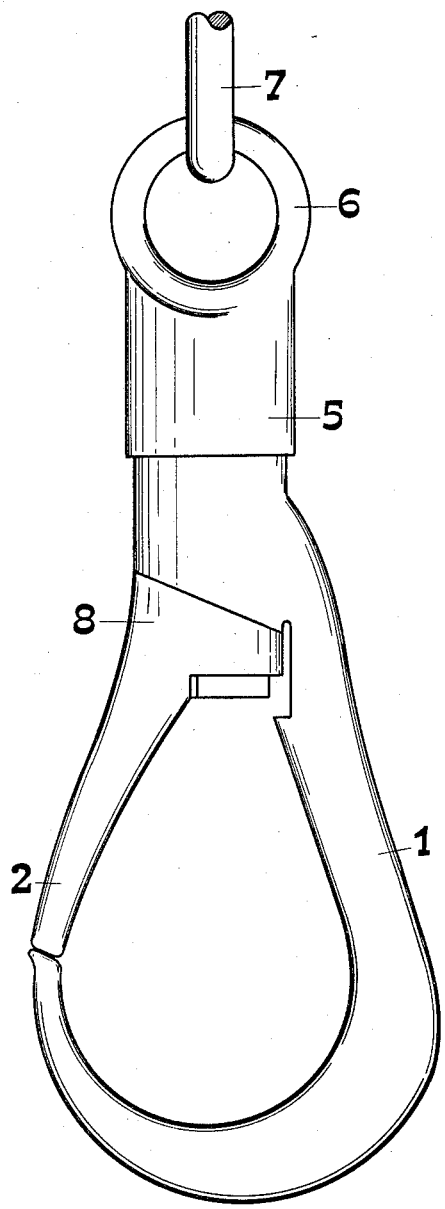
FIG. 1 is a side elevational view of the hook and guard, shown in its closed position.
Figure 2:
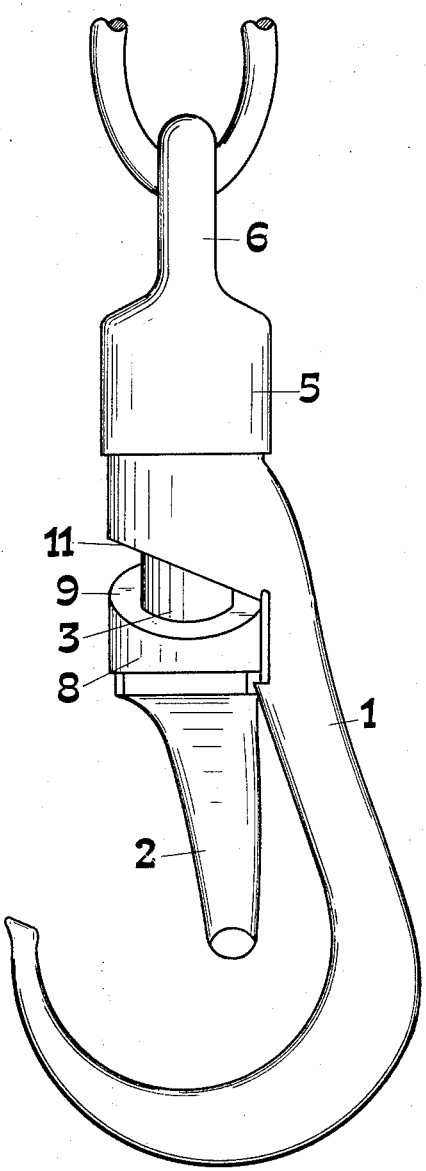
FIG. 2 is a side elevational view of the hook and guard, shown in open position.

As is seen by referring to the drawings, the device is formed of two parts which are referred to generally as the hook portion 1 and the safety guard 2. The safety guard 2 has a shaft 3 integrally formed thereon. The shaft 3 has a ring 4 attached thereto, at the upper end, as by welding, and a bushing or cap member 5 is attached to the outer periphery of the ring 4, as by welding. A conventional ring 6 is provided on the top of cap 5 for attachment to a lifting or tow rope 7. The safety guard 2 is enlarged intermediate its ends to form a neck portion 8, the diameter of which is greater than that of shaft 3. An inclined plane 9 is formed on the upper surface of the neck portion 8, the lines of the steepest slope of which are more or less parallel to the plane containing the safety guard 2 when the safety guard 2 and hook 1 are in closed position. A bushing 10 is integrally formed on the upper portion of the hook 1 in which shaft 3 is normally disposed. The outer diameter of bushing 10 is the same as the outer diameter of the neck portion 8, with the inner diameter of, or the opening in, the bushing 10 being slightly wider than the diameter of the shaft 3. Bushing 10 has an inclined plane 11 on its lower face that has the same slope as and mates with the inclined plane 9 on neck 8, with the steepest slope line of the plane 11 being more or less parallel to the plane containing the hook 1 when the safety guard and hook are in closed position. The lower face of neck 8 is cut away to form a notch or groove 13 extending partially around neck 8 and having shoulders 14 at the ends of the notch. A boss or outrigger 15 is formed on the neck 16 of the main hook 1, which will, in cooperation with the shoulders 14 limit pivotal movement of the hook 1 with respect to the safety guard 2 in clockwise and counterclockwise directions. It is preferred that the pivoting of the safety guard 2 with respect to the hook 1 be limited to about 110 degrees in each direction.

With respect to operation of the device, the rope 7 is connected through the loop 6 to the safety guard 2, which in turn supports the hook 1. When a load is attached to hook 1 and a lifting force is applied to the tow rope 7, the safety guard device will be pivoted to a closed position because of the coaction between inclined planes 9 and 11. The force keeping the safety guard 2 closed with respect to the hook 1 will be directly proportional to the load placed on the rope 7, with the safety of the device increasing as the load increases. Even if there is no load applied, the weight of the hook 1 will be enough to normally keep the safety guard 2 and the hook 1 closed with respect to each other.

When it is desired to open the device for insertion of load straps or cables, the operator grasps the bushing or cap 5 with one hand and by twisting the cap 5 can pivot the safety guard device 2 out of engagement with the tip of the hook 1, while using his other hand to attach the load straps or cables to the main hook 1, which for all intents and purposes would be the same as an open hook. When force is applied to the rope 7 the safety guard 2 will be automatically pivoted to a closed condition with relation to the hook 1.

The safety device described herein is much safer than the conventional open hooks used for lifting in that it will positively prevent disengagement of the load or cables or straps attached to the hook and also precludes the possibility of accidentally catching the hook on some unavoidable obstacle that may be engaged by the hook during its movement. It also possesses advantages over prior known hooks that have been provided with a guard in that it does not use a spring or other closing device, the effectiveness of which is not always certain, and in that it has a resistance to opening which is directly proportional to the load or force exerted on the rope 7. Further it is to be noted that the device cannot be opened accidentally by impacts on the load that may be encountered during lifting, lowering or other movements. Finally, by virtue of the fact that the safety guard 2 has a pivotal opening and closing movement with respect to the hook 1 it avoids the possibility of having the load straps or cables being caught between the guard and the hook which would prevent imperfect closing of the hook and the attendant risks that would be involved.

The strength of the proposed device, its safety and easiness of operation suggest its use in particular environments, such as, for example, in ports or harbors, where the operators charged with loading and unloading are psychologically sensitive to the potential danger of their work and to the very frequent accidents that occur.

MODIFIED FORM OF THE INVENTION

The preferred embodiment of the invention can be modified, if so desired, so as to eliminate the necessity of providing the groove 13, shoulders 14 and boss 15. This can be done by making the length of the shaft 3 such that the stroke heightwise of the bushing 10 will be shorter than the combined height of the inclined planes 9 and 11, with the upper surface 12 of bushing 10 engaging against the lower surface 17 of the ring 4 to limit the amount of turning or pivotal movement of the hook 1 with respect to the safety guard 2.

What is claimed is:

1. A claw hook having an automatic safety guard comprising:
   a safety guard for attachment to a lifting rope, said safety guard having an upwardly extending shaft;
   a hook for attachment to a load to be lifted, said hook having a bushing formed thereon that is telescopically received on said shaft for pivotal and heightwise movement with respect to said safety guard;
   an inclined plane formed on said shaft; and
   a mating inclined plane formed on said bushing, whereby said guard may be pivoted in either direction for loading purposes and will be automatically pivoted to a closed condition when said hook is attached to a load and force is applied to said lifting rope.

2. A device as set forth in claim 1, further including:
   stop means on said safety guard for limiting the heightwise movement of said bushing to control the amount of pivotal movement of said hook.

3. A claw hook having an automatic safety guard comprising:
   a safety guard for attachment to a lifting rope;
   a hook for attachment to a load to be lifted, said hook being mounted on said safety guard for pivotal movement with respect to said safety guard;
   means for limiting the extent of pivotal movement of said hook comprising:
   a boss formed on said hook; and
   said safety guard is provided with a groove having a pair of spaced shoulders for engagement by said boss to limit the pivotal movement of said hook with respect to said safety guard; and
   cooperating means on said safety guard and said hook for effecting pivotal closing movement of said hook with respect to said safety guard.

4. A device as set forth in claim 3 wherein:
   said safety guard includes an upwardly extending shaft; and
   wherein said hook has a bushing telescopically received on said shaft for heightwise movement thereon.

5. A device as set forth in claim 4 wherein said cooperating means comprises:
   an inclined plane formed on said shaft; and
   a mating inclined plane formed on said bushing, whereby when said hook is attached to a load and force is applied to said lifting rope, said safety guard will be pivoted to a closed condition.

* * * * *